(12) United States Patent
Marchand

(10) Patent No.: US 11,794,699 B2
(45) Date of Patent: Oct. 24, 2023

(54) WINDSCREEN WIPER DEVICE

(71) Applicant: TRICO BELGIUM SA, Aubange (BE)

(72) Inventor: Thimotey Marchand, Herserange (FR)

(73) Assignee: TRICO BELGIUM SA, Aubange (BE)

(*) Notice: Subject to any disclaimer, the term of this patent is extended or adjusted under 35 U.S.C. 154(b) by 94 days.

(21) Appl. No.: 16/642,943

(22) PCT Filed: Aug. 28, 2017

(86) PCT No.: PCT/EP2017/071553
§ 371 (c)(1),
(2) Date: Feb. 28, 2020

(87) PCT Pub. No.: WO2019/042525
PCT Pub. Date: Mar. 7, 2019

(65) Prior Publication Data
US 2020/0346622 A1 Nov. 5, 2020

(51) Int. Cl.
B60S 1/40 (2006.01)

(52) U.S. Cl.
CPC ........... B60S 1/4048 (2013.01); B60S 1/4045 (2013.01); *B60S 2001/4051* (2013.01); *B60S 2001/4054* (2013.01)

(58) Field of Classification Search
CPC .... B60S 1/4038; B60S 1/3868; B60S 1/4045; B60S 1/4048; B60S 1/3429; B60S 2001/4051; B60S 2001/4054
USPC ...................................................... 15/250.32
See application file for complete search history.

(56) References Cited

U.S. PATENT DOCUMENTS

| | | | |
|---|---|---|---|
| 2010/0005609 A1* | 1/2010 | Kim ...................... | B60S 1/4003 15/250.32 |
| 2010/0011528 A1* | 1/2010 | Boland ................. | B60S 1/3806 15/250.3 |
| 2013/0239353 A1 | 9/2013 | Yoshimoto et al. | |
| 2017/0015281 A1* | 1/2017 | Mouleyre ............. | B60S 1/3874 |
| 2020/0023813 A1* | 1/2020 | Shimizu ............... | B60S 1/4048 |

FOREIGN PATENT DOCUMENTS

| | | |
|---|---|---|
| EP | 1403156 | 3/2004 |
| WO | 2016000778 | 1/2016 |
| WO | 20160005103 | 1/2016 |
| WO | 2017136845 | 8/2017 |
| WO | 20170142971 | 8/2017 |

* cited by examiner

Primary Examiner — Gary K. Graham
(74) Attorney, Agent, or Firm — Bryan Cave Leighton Paisner LLP

(57) ABSTRACT

A windscreen wiper device is provided. The device comprises a connecting device pivotally connected to an oscillating arm about a pivot axis, with the interposition of a joint part. The joint part comprises at least one resilient tongue engaging a correspondingly shaped hole provided in the oscillating arm. The resilient tongue is rotatable along a hinge axis between an outward position retaining the wiper blade onto the oscillating arm and an inward position releasing the wiper blade from the oscillating arm. The oscillating arm has an at least substantially U-shaped cross-section at the location of its connection to the joint part and at least one leg of the U-shaped cross-section of the oscillating arm comprises an inwardly extending protrusion cooperating with a bottom surface of a side wall of the joint part near an extremity of the joint part facing away from the free end of the oscillating arm.

13 Claims, 2 Drawing Sheets

WINDSCREEN WIPER DEVICE

BACKGROUND OF THE INVENTION

A windscreen wiper device is generally known from European patent publication no. 1 403 156 of the same Applicant. This prior art windscreen wiper device is designed as a "yokeless" wiper device or "flat blade", wherein no use is made of several yokes pivotally connected to each other, but wherein the wiper blade is biased by the carrier element, as a result of which it exhibits a specific curvature. In this prior art windscreen wiper device, the joint part comprises at least one resilient tongue engaging in a correspondingly shaped hole provided in the oscillating arm, wherein the resilient tongue is rotatable along an hinge axis between an outward position retaining the wiper blade onto the oscillating arm and an inward position releasing the wiper blade from the oscillating arm. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm. In practice this interconnection between the joint part and the oscillating arm is called a bayonet connection.

SUMMARY OF THE INVENTION

The object of the invention is to provide an improved windscreen wiper device at minimum costs—without using complex machinery and additional tools—while the connecting device and the oscillating arm can be interconnected in a reliable and secure manner, using less parts. It is a further object of the invention to provide a connection between the oscillating arm and the wiper blade, which is esthetically attractive and easy to assemble and dissemble by the general public. Thereby, those without specific skills are enabled to replace the windscreen wiper if required.

The present invention relates to a windscreen wiper device comprising an elastic, elongated carrier element, as well as an elongated wiper blade of a flexible material, which can be placed in abutment with a windscreen to be wiped. The wiper blade is of the flat blade type and includes at least one longitudinal groove, in which groove a longitudinal strip of the carrier element is disposed, which windscreen wiper device comprises a connecting device for an oscillating arm. The oscillating arm is pivotally connected to the connecting device about a pivot axis near a free end thereof, with the interposition of a joint part. The joint part comprises at least one resilient tongue engaging in a correspondingly shaped hole provided in the oscillating arm. The resilient tongue is rotatable along an hinge axis between an outward position retaining the wiper blade onto the oscillating arm and an inward position releasing the wiper blade from the oscillating arm. The oscillating arm has an at least substantially U-shaped cross-section at the location of its connection to the joint part.

Particularly, the wiper blade comprises a spoiler at a side thereof facing away from the windscreen to be wiped. The wiper blade and the spoiler are preferably made in one piece through extrusion. The longitudinal groove is preferably a central longitudinal groove accommodating the longitudinal strip. The longitudinal strip is also called a "flexor" and the connecting device is also indicated as a "connector". In the framework of the present invention, the connector is preferably made in one piece, also called a "one piece connector". The joint part is preferably made of plastic.

It is noted that the present invention is not restricted to cars, but also refers to rail coaches and other (fast) vehicles.

Thereto, according to the invention, a windshield wiper device mentioned in the preamble is characterized in that at least one leg of the U-shaped cross-section of the oscillating arm comprises an inwardly extending protrusion cooperating with a bottom surface of a side wall of the joint part near an extremity of the joint part facing away from the free end of the oscillating arm. Hence, any movement in vertical direction, i.e. in use in a direction to and from a windscreen to be wiped, of the joint part at its rear side inside the U-shaped cross-section of the oscillating arm (i.e. thus relative to the oscillating arm) is at least limited, but in practice often avoided in its entirety. The claimed cooperation between the resilient tongue of the joint part and the correspondingly shaped hole provided in the oscillating arm ensures blockage of the joint part inside the U-shaped cross-section of the oscillating arm (i.e. thus relative to the oscillating arm) in longitudinal direction. The hole of the oscillating arm is particularly provided in a base of the U-shaped cross-section thereof. Preferably, the hole has a closed circumference. Preferably, both legs of the U-shaped cross-section of the oscillating arm comprise inwardly extending, opposite protrusions cooperating with bottom surfaces of opposite side walls of the joint part.

Further, it is noted that in the invention use is made of a mounting head fixed for rotation to a shaft, wherein the shaft is rotatable alternately in a clockwise and in a counter-clockwise direction carrying the mounting head into rotation. Thus, in turn the mounting head draws the connecting device into rotation and thereby moves the wiper blade. In the alternative, the mounting head is fixed for translation to a carriage. The carriage can be translated alternately in a one linear direction and in another counter linear direction carrying the mounting head into translation. The present invention can therefore be used for circular or linear movement of the mounting head.

In a preferred embodiment of a windscreen wiper device in accordance with the invention, the protrusion cooperates with an elevated part of the bottom surface of the side wall of the joint part. Hence, the side wall particularly forms a stepped profile. A lower part of the bottom surface and the elevated, i.e. upper part of the bottom surface form steps of the stepped profile.

It is further preferred that the joint part and the oscillating arm are assembled only by a linear movement of the joint part towards the oscillating arm in a longitudinal direction parallel to a longitudinal axis of the oscillating arm until the resilient tongue engages inside the hole provided in the oscillating arm. Before installation of the wiper blade onto the oscillating arm, the oscillating arm can be moved in an upright position relative to the windscreen to be wiped, which is also referred to as the service position. The wiper blade is then installed onto the oscillating arm by placing the extremity of the joint part facing away from the free end of the oscillating arm into the substantially U-shaped cross-section of the oscillating arm and moving it in single substantially linear sliding movement towards an end of the oscillating arm that is fixed to the mounting head along a direction substantially parallel to the longitudinal axis of the oscillating arm. Once the joint part is fully inserted, the resilient tongue engages the corresponding hole in the oscillating arm by snapping operation. The wiper blade is dismountable by pressing the resilient tongue, whereby it bends inwardly, and reversing the installation operations thereby enabling an easy mounting and dismounting of the wiper blade, such that persons with no particular skills are able to change the wiper blades on a vehicle.

It is further preferred that an end section of the side wall of the joint part near the extremity of the joint part facing away from the free end of the oscillating arm is substantially sloping.

During assembly of the wiper blade, with interposition of the connecting device and the joint part, onto the oscillating arm the inwardly extending protrusion is guided over the sloping surface towards the bottom surface of a side wall of the joint part thereby the installation of the wiper blade onto the oscillating arm is made even easier.

In another preferred embodiment of a windscreen wiper device according to the invention, at least one leg of the U-shaped cross-section of the oscillating arm comprises a recess extending in longitudinal direction and open towards the free end of the oscillating arm. The recess cooperates with a correspondingly shaped protuberance extending in longitudinal direction on a side wall of the joint part towards the free end of the oscillating arm. Hence, any movement in vertical direction, i.e. in use in a direction to and from a windscreen to be wiped, of the joint part at its front side inside the U-shaped cross-section of the oscillating arm (i.e. thus relative to the oscillating arm) is at least limited, but often avoided in its entirety. Particularly, the protuberance engages into the recess. More in particular, the recess and the protuberance are elongated. Preferably, both legs of the U-shaped cross-section of the oscillating arm comprise opposite recesses extending in longitudinal direction and open towards the free end of the oscillating arm. The recesses cooperate with correspondingly shaped opposite protuberances extending in longitudinal direction on opposite side walls of the joint part towards the free end of the oscillating arm.

In another preferred embodiment of a windscreen wiper device in accordance with the invention, a top surface of the joint part comprises a protruding lip extending in longitudinal direction towards the free end of the oscillating arm. A base of the U-shaped cross-section of the oscillating arm engages into a slit defined by the top surface and the protruding lip. Hence, any movement in vertical direction, i.e. in use in a direction to and from a windscreen to be wiped, of the joint part at its front side inside the U-shaped cross-section of the oscillating arm (i.e. thus relative to the oscillating arm) is at least limited, but often avoided in its entirety.

In another preferred embodiment of a windscreen wiper device according to the invention, the joint part is detachably attached to the connecting device by pivotally engaging projections of the connecting device, at the location of the pivot axis, in recesses provided in the joint part. Preferably, the joint part has an at least substantially U-shaped cross-section at the location of its attachment to the connecting device. The joint part in each leg of the U-shaped cross-section is provided with a recess provided coaxially with the pivot axis. Preferably, the projections extend outwards on either side of the connecting device. The projections are at least substantially cylindrical.

In another preferred embodiment of a windscreen wiper device in accordance with the invention, the hinge axis of the joint part is facing towards the free end of the oscillating arm. In the alternative, the hinge axis of the joint part is facing away from the free end of the oscillating arm.

The present invention also relates to an elongated wiper blade of a flexible material as such (i.e. without an oscillating arm), which can be placed in abutment with a windscreen to be wiped. The wiper blade is of the flat blade type and includes at least one longitudinal groove, in which groove a longitudinal strip of a carrier element is disposed, as well as a connecting device for an oscillating arm. The oscillating arm can be pivotally connected to the connecting device about a pivot axis near a free end thereof, with the interposition of a joint part. The joint part is detachably connected to the connecting device and comprises at least one resilient tongue arranged to engage in a correspondingly shaped hole provided in the oscillating arm. The resilient tongue is rotatable along an hinge axis between an outward position retaining the wiper blade onto the oscillating arm and an inward position releasing the wiper blade from the oscillating arm. An elevated part of a bottom surface of a side wall of the joint part near an extremity of the joint part in use facing away from the free end of the oscillating arm is arranged to be engaged by a protrusion extending inwardly on at least one leg of a U-shaped cross-section of the oscillating arm.

The invention will now be explained in more detail with reference to figures illustrated in a drawing, wherein:

DETAILED DESCRIPTION OF THE PREFERRED EMBODIMENTS

Figure 1:
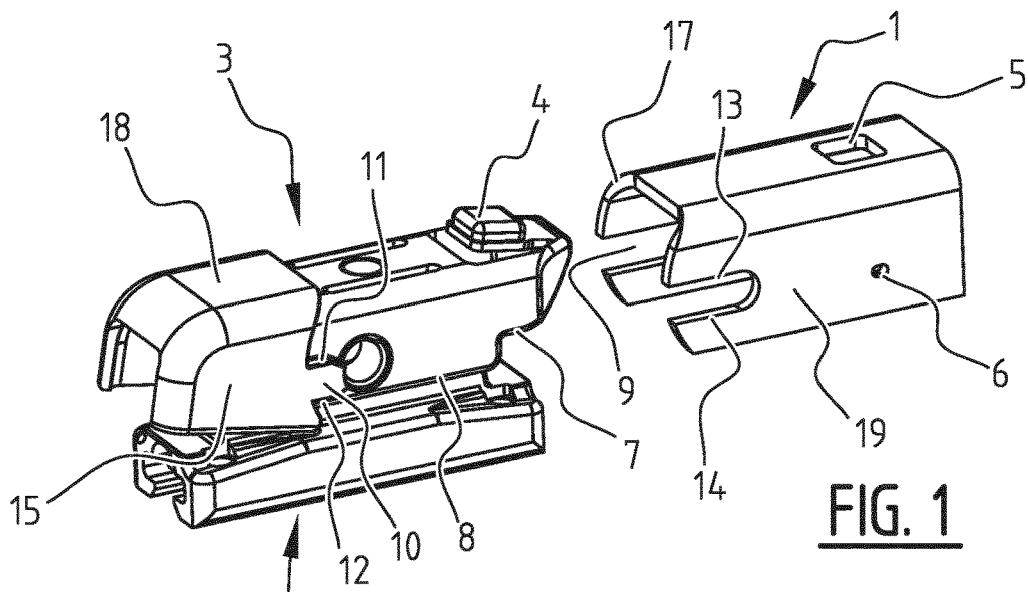
FIGS. 1, 2 and 3 show various successive steps for fitting the joint part/connecting device and the oscillating arm of a windscreen wiper device together according to a preferred embodiment of the invention.
Figure 2:
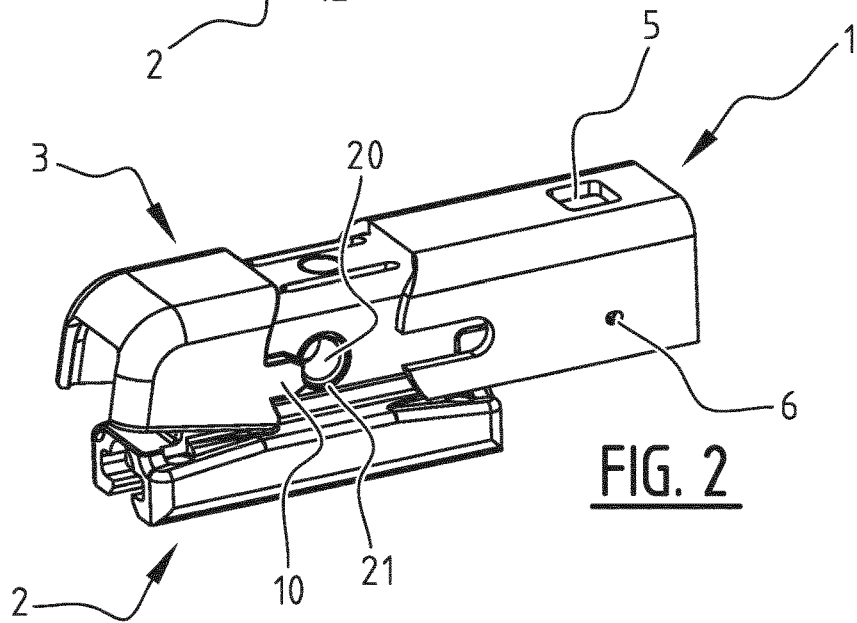
Figure 3:
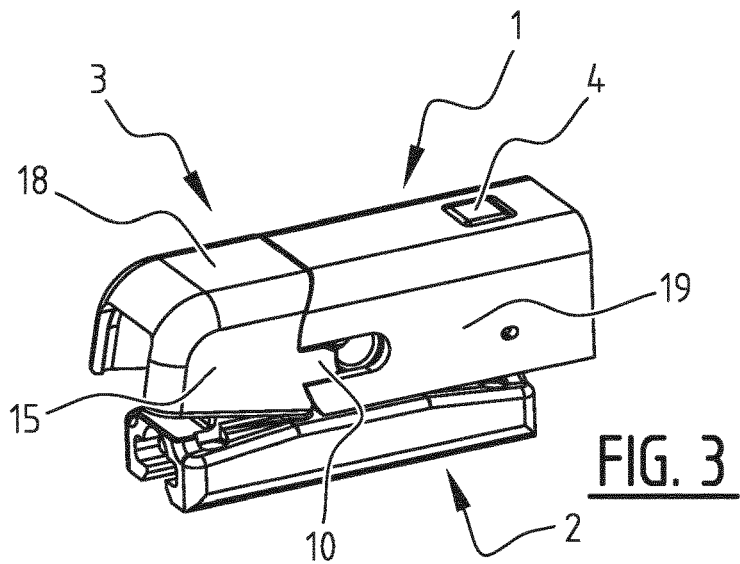

In FIGS. 1 through 3 various successive steps are shown for connecting the connecting device 2, with the interposition of a joint part 3, and the oscillating arm 1 of a windscreen wiper device together according to a preferred embodiment of the invention. Although not shown, but fully understood by a skilled person, such a windscreen wiper device of the flat blade type is typically built up of an elastomeric (rubber) wiper blade comprising a central longitudinal groove. A longitudinal strip made of spring band steel is fitted in the longitudinal groove. The strip forms a flexible carrier element for the rubber wiper blade, as it were, which is thus biased in a curved position (the curvature in operative position being that of a windscreen to be wiped). Usually an end of the strip and/or an end of the wiper blade is connected on either side of the windscreen wiper device to respective connecting pieces or "end caps". The connecting pieces may be formed as separate constructional elements, which may be form-locked as well as force-locked to both ends of the strip and/or ends of the wiper blade. In the alternative, the connecting pieces may be in one piece with the strip made of spring band steel.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. The groove(s) may be closed at one outer end.

The joint part 3 comprises a resilient tongue 4 extending outwardly, while the oscillating arm 1 has a U-shaped cross-section at the location of its connection to the joint part 3, so that the tongue 4 engages in a correspondingly shaped hole 5 provided in a base of the U-shaped cross-section. The connecting device 2 with the wiper blade is mounted onto the oscillating arm 1 as follows. The joint part 3 being already clipped onto the connecting device 2, so that the joint part 3 can be easily slid on a free end of the oscillating arm 1. During this substantially linear sliding movement the resilient tongue 4 is initially pushed in against a spring force and then allowed to spring back into the hole 5, thus snapping, that is clipping the resilient tongue 4 into the hole 5. This is a so-called bayonet-connection. By subsequently pushing in again the resilient tongue 4 against the spring force (as if it were a push button), the connecting device 2 and the joint part 3 together with the wiper blade may be released from the oscillating arm 1. Dismounting the connecting device 2 with the wiper blade from the oscillating arm 1 is thus realized by sliding the connecting device 2 and the joint part 3 together with the wiper blade in a direction away from the oscillating arm 1.

Although not shown in FIG. 1, but fully understood by a skilled person, the oscillating arm 1 is connected to a mounting head fixed for rotation to a shaft driven by a small motor. In use, the shaft rotates alternately in a clockwise and in a counter-clockwise sense carrying the mounting head into rotation also, which in turn draws the oscillating arm 1 into rotation and by means of the connecting device 2 moves the wiper blade.

Figure 4:
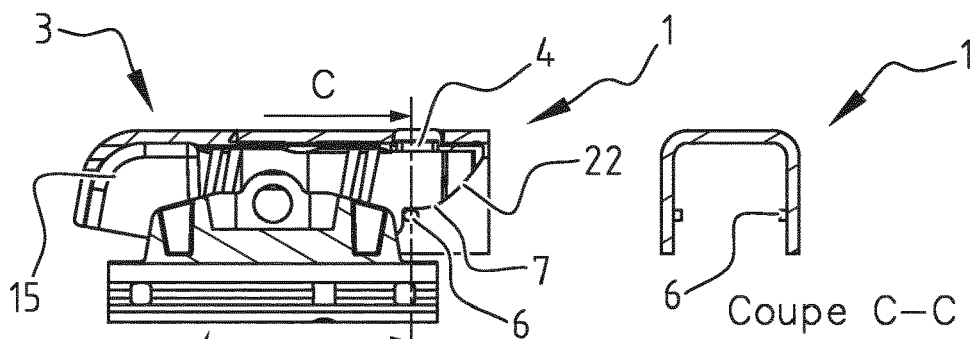
FIG. 4 is a schematic cross-sectional view of the windscreen wiper device of FIG. 3 in longitudinal direction along a line A-A (on the left) and transversal direction along a line C-C (on the right)

The legs of the U-shaped cross-section of the oscillating arm comprise an inwardly extending protrusion 6, as can also be seen in FIG. 4. These inwardly extending protrusions 6 cooperate with an elevated bottom surface 7 of a side wall of the joint part 3. Hence, any movement in vertical direction, which corresponds to a direction orthogonal to the windscreen to be wiped when the wiper blade is engaged with the windscreen, is at least limited. Lower bottom surface 8 and elevated bottom surface 7 form steps of a stepped profile.

Furthermore, it can be seen if FIGS. 1 through 3 and 5 that the oscillating arm 1 comprises a recess 9 extending in a longitudinal direction, which is open towards the free end of the oscillating arm. The recess 9 is arranged to engage with a correspondingly shaped protuberance 10 extending in a longitudinal direction on a side wall of the joint part 3, thereby limiting any movement in the vertical direction. More specifically, in an installed configuration, the upper edges 11 and lower edges 12 of the protuberance 10 are substantially engaged with a part of the corresponding upper edges 13 and lower edges 14 of the recess 9, respectively.

Figure 5:
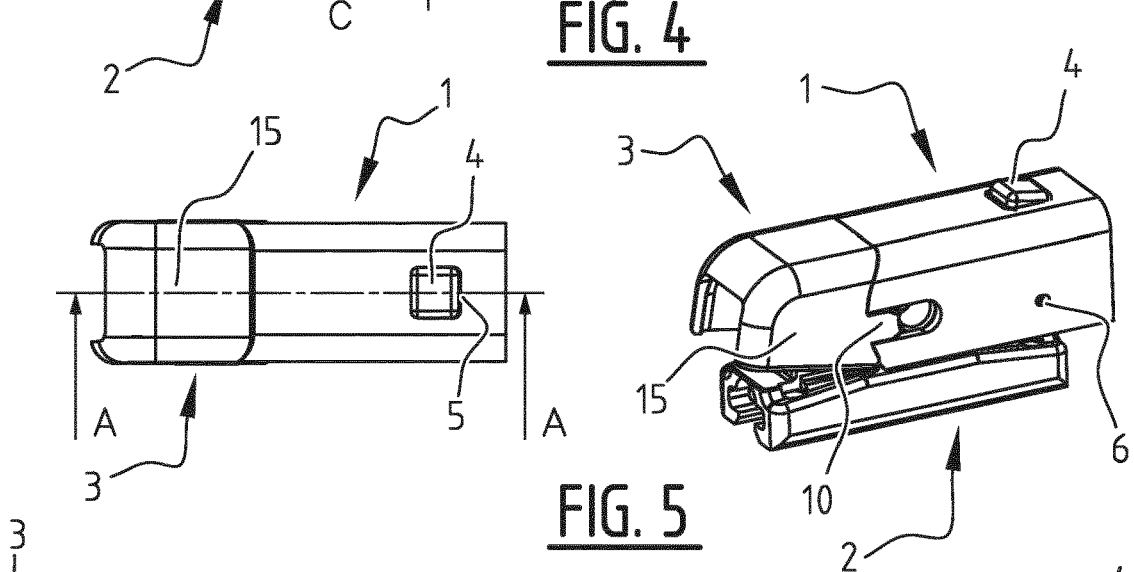
FIG. 5 is a schematic top view (on the left) of the windscreen wiper device of FIG. 3 (on the right)

Note that in the illustrated embodiment, the relative movement between the oscillating arm 1 and the joint part 3 is restricted in all directions, by the mutually cooperating connecting means as disclosed, as is shown in FIGS. 4 and 5. Hence, a reliable and secure connection between the wiper blade and the oscillating arm 1 is obtained.

The protuberance 10 is preferable substantially flush with the free end 15 of the joint part 3. In addition, the free end 15 is preferably arranged such that its edges 16 at a first end are arranged to substantially abut edges 17 at a distal end of the oscillating arm 1. Thereby, in the assembled state, the outer surfaces 18 of the free end 15 are substantially flush with the outer surfaces 19 of the oscillating arm 1. Hence, an esthetically pleasing connection is obtained that substantially shields the connecting between the connecting device 2 and the joint part 3 from exposure to rain, dust, UV light and ice.

Figure 6:
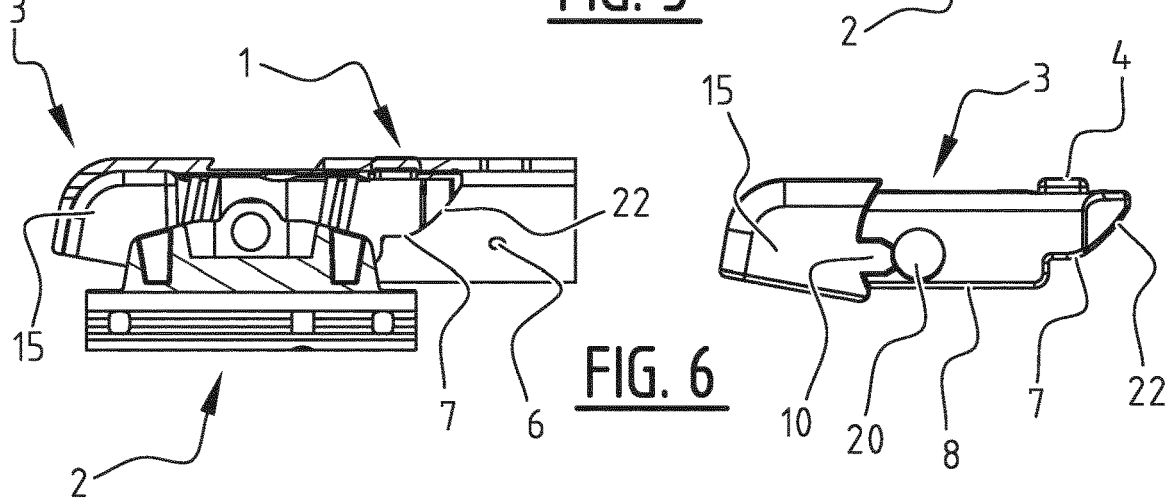
FIG. 6 is a schematic cross-sectional view (on the left) of the windscreen wiper device of FIG. 5 in longitudinal direction along a line B-B, as well as a schematic side view (on the right) of the joint part used in the windscreen wiper device of FIGS. 1, 2 and 3.
Figure 7:
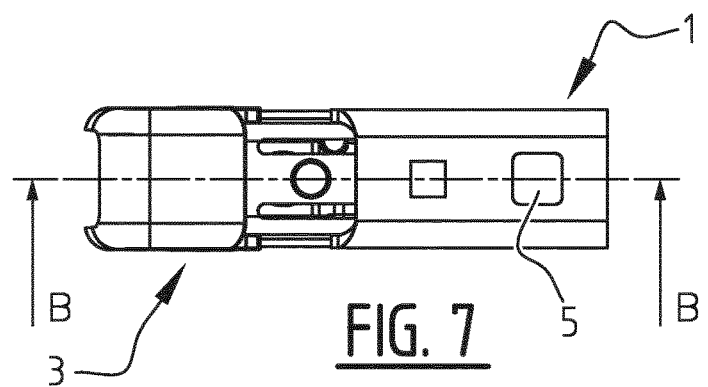
FIG. 7 is a schematic top view of the windscreen wiper device of FIG. 2.

In support of a more simple installation of the joint part 3 onto the oscillating arm 1, it is further preferred if a sloping section 22, which comprises a portion of a dimple, is arranged at a first end of the joint part 3, which first end is facing away from the free end of the oscillating arm 1, as can be seen in FIGS. 4 and 6.

In the preferred embodiment shown in FIG. 1 through 7, the joint part 3 is connected to connecting device 2 by pivotally engaging projections 21, which extend outwards on either side of the connecting device 2 and engage in correspondingly shaped recesses 20 on either side of the joint part. Due to the fact that the projections 21 and recesses 20 are provided coaxially and are substantially cylindrically shaped, the connecting device 2 and joint part 3 can hinge along a pivot axis.

The present windscreen wiper device is preferably a front window windscreen wiper device.

The invention claimed is:

1. A windscreen wiper device comprising:
   a connecting device; and
   a joint part detachably and pivotably connected to said connecting device about a pivot axis;
   said joint part comprising at least one resilient tongue engaging in a correspondingly shaped hole provided in an oscillating arm wherein said at least one resilient tongue is rotatable along an hinge axis between an outward position and an inward position,
   wherein:
      said oscillating arm has an at least substantially U-shaped cross-section at a location of its connection to said joint part,
      at least one leg of said U-shaped cross-section of said oscillating arm comprises an outer surface, an inner surface, a first end, and a second end, the first end of the at least one leg abutting a top surface of the oscillating arm, the second end of the at least one leg positioned opposite the first end,
      an inwardly extending protrusion is positioned on the inner surface of the at least one leg and spaced between and apart from the first end of the at least one leg and the second end of the at least one leg, the protrusion cooperating with a bottom surface of a side wall of said joint part near an extremity of said joint part facing away from a free end of said oscillating arm,
      the bottom surface comprises an elevated portion and a lower portion, the elevated portion and the lower portion define a stepped profile,
      a sloping section is arranged at an end of the joint part adjacent the extremity of the joint part, the sloping section comprising a portion of a dimple that tapers towards the elevated portion of the stepped profile to guide the inwardly extending protrusion,
      said protrusion cooperates with the elevated portion of said bottom surface of said side wall of said joint part,
      said joint part and said oscillating arm are assembled by a linear movement of said joint part towards said oscillating arm in a longitudinal direction parallel to a longitudinal axis of said oscillating arm until said resilient tongue engages inside said hole provided in said oscillating arm, and said joint part is detachably attached to said connecting device by pivotally engaging projections of said connecting device, at the location of said pivot axis, in recesses provided in said joint part.

2. A windscreen wiper device according to claim 1, wherein said protrusion engages said bottom surface of said side wall of said joint part.

3. A windscreen wiper device according to claim 1, wherein both legs of said U-shaped cross-section of said oscillating arm comprise inwardly extending, opposite protrusions cooperating with bottom surfaces of opposing side walls of said joint part.

4. A windscreen wiper device according to claim 1, wherein at least one leg of said U-shaped cross-section of said oscillating arm comprises a recess extending in longitudinal direction and open towards said free end of said oscillating arm, and wherein said recess cooperates with a correspondingly shaped protuberance extending in longitudinal direction on a side wall of said joint part towards said free end of said oscillating arm.

5. A windscreen wiper device according to claim 4, wherein said protuberance engages into said recess.

6. A windscreen wiper device according to claim 4, wherein said recess and said protuberance are both elongated.

7. A windscreen wiper device according to claim 4, wherein both legs of said U-shaped cross-section of said oscillating arm comprise opposite recesses extending in longitudinal direction and open towards said free end of said oscillating arm, and wherein said recesses cooperate with correspondingly shaped opposite protuberances extending in longitudinal direction on opposing side walls of said joint part towards said free end of said oscillating arm.

8. A windscreen wiper device according to claim 1, wherein said joint part is made of plastic.

9. A windscreen wiper device according to claim 1, wherein said joint part has an at least substantially U-shaped cross-section at the location of its attachment to said connecting device, and wherein said joint part in each leg of said U-shaped cross-section is provided with the recess provided coaxially with said pivot axis.

10. A windscreen wiper device according to claim 1, wherein the projections extend outwards on either side of said connecting device, and wherein the projections are at least substantially cylindrical.

11. A windscreen wiper device according to claim 1, wherein the projections and the recesses are visible externally.

12. A windscreen wiper device according to claim 1, wherein said hinge axis of said resilient tongue is located at a side thereof facing towards said free end of said oscillating arm.

13. A windscreen wiper device according to claim 1, wherein:

the inwardly extending protrusion extends inward toward a cavity of the oscillating arm, the cavity defined by the at least one leg and a second leg positioned opposite the at least one leg;

the inwardly extending protrusion is adapted to engage the sloping section when the oscillating arm is being coupled to the joint part; and the sloping section is adapted to guide the inwardly extending protrusion into the elevated portion of the stepped profile.

* * * * *